(12) United States Patent
Yu et al.

(10) Patent No.: US 8,224,323 B2
(45) Date of Patent: Jul. 17, 2012

(54) ENHANCED TIMER BASED REGISTRATION METHOD FOR WIRELESS COMMUNICATION NETWORKS

(75) Inventors: YuanFang Yu, GuangDong (CN); Xiaowu Zhao, GuangDong (CN); Rajesh Bhalla, Westmont, IL (US); Yonggang Fang, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 1003 days.

(21) Appl. No.: 12/118,610

(22) Filed: May 9, 2008

(65) Prior Publication Data
US 2008/0280608 A1 Nov. 13, 2008

Related U.S. Application Data

(60) Provisional application No. 60/917,067, filed on May 10, 2007.

(51) Int. Cl.
*H04W 4/00* (2009.01)
(52) U.S. Cl. ............ 455/435.1; 455/456.1; 455/456.2; 455/456.3; 455/435.2; 455/435.3; 370/331; 370/332
(58) Field of Classification Search .... 455/435.1–435.3, 455/443, 456.1–456.6; 370/331, 332, 390, 370/349, 432
See application file for complete search history.

(56) References Cited

U.S. PATENT DOCUMENTS

| 2005/0070283 | A1  | 3/2005 | Hashimoto et al. |
| 2005/0079873 | A1* | 4/2005 | Caspi et al. ............... 455/456.1 |
| 2008/0268877 | A1* | 10/2008 | Harris ........................ 455/458 |

FOREIGN PATENT DOCUMENTS

| CN | 1602110 A | 3/2005 |
| CN | 1806453 A | 7/2006 |
| WO | 2005/001503 A2 | 1/2005 |

OTHER PUBLICATIONS

State Intellectual Property Office (SIPO) Office Action mailed May 29, 2012 for Chinese Patent Application No. 200810096969.8, filed May 12, 2008 (4 pages).

* cited by examiner

*Primary Examiner* — Wayne Cai
(74) *Attorney, Agent, or Firm* — Perkins Coie LLP

(57) ABSTRACT

Techniques and systems that provide timer based registration for efficiently registering access terminals with a wireless network are described. A timer is provided for an access terminal to register with the network. When the timer expires, the access terminal performs a timer based registration process if a currently serving base station is not the same as a base station that serves the access terminal when the access terminal completes the last timer based registration process, and avoids performing another timer based registration process if the currently serving base station is the same as a base station that serves the access terminal when the access terminal completes the last timer based registration process. The access terminal resets the timer if the currently serving base station is the same as a base station that served the access terminal when the access terminal completes the last timer based registration process.

18 Claims, 2 Drawing Sheets

ENHANCED TIMER BASED REGISTRATION METHOD FOR WIRELESS COMMUNICATION NETWORKS

PRIORITY CLAIM AND RELATED PATENT APPLICATION

This patent application claims the benefit of U.S. Provisional Application No. 60/917,067 entitled "ENHANCED TIMER BASED REGISTRATION METHOD FOR WIRELESS COMMUNICATION NETWORKS" and filed on May 10, 2007, which is incorporated by reference as part of the specification of this patent application.

BACKGROUND

This patent application relates to wireless communications.

Wireless communications networks can include Access Network (AN) equipment and Mobile Station (MS) or Access Terminal (AT) equipment that communicate over the air-interface by the use of Radio Transmission Technologies. In some implementations, the Access Network equipment can include, among others, base stations that form a cellular radio access network. Examples of wireless communications networks based on Radio Transmission Technologies (RTT) include wireless networks developed by 3GPP/3GPP2 organizations and the wireless technologies being developed by the IEEE Standards Association.

In order to establish the air-interface connection, the Access Network and the Access Terminal perform signaling procedures that are based on methods and protocols specific to the RTT technologies. For example, the air-interface connection between the Access Network and the Access Terminals may be established either by the Access Terminal initiating connection establishment procedures known as Mobile Initiated Origination or by the Access Network "Paging" the Access Terminal known as Mobile Terminated Paging.

SUMMARY

This patent application describes techniques and systems that provide enhanced timer based registration for efficiently registering access terminals with a wireless network.

In one aspect, a method for efficiently registering access terminals in wireless communications described in this patent application includes providing a timer for an access terminal to register with a network; and operating the access terminal to send a registration message when both (1) the timer expires and (2) a location of the access terminal has changed from a previous location when a last registration message was sent by the access terminal to the network.

In another aspect, a method for efficiently registering access terminals in a wireless communication network described in this patent application includes providing a timer for an access terminal to register with the network to cause the access terminal to initiate a timer based registration process with the network based on the timer. The timer based registration process with the network informs the network of the current location of the access terminal. When the timer expires, this method causes the access terminal to perform timer based registration process with the network if a currently serving base station is not the same as a base station that serves the access terminal when the access terminal completes the last timer based registration process with the network, and to avoid performing another timer based registration process with the network if the currently serving base station is the same as a base station that serves the access terminal when the access terminal completes the last timer based registration process with the network. The access terminal is operated to reset the timer if the currently serving base station is the same as a base station that serves the access terminal when the access terminal completes the last timer based registration process with the network.

In yet another aspect, a wireless communication network described in this patent application includes an access network comprising a plurality of base stations to provide wireless radio access to access terminals in wireless radio communication with the access network; and a mechanism that provides a timer for an access terminal to register with the access network to cause the access terminal to initiate a timer based registration process with the network based on the timer. The timer based registration process with the network causes the access terminal to send a registration message to inform the network of a current location of the access terminal. This network includes a mechanism that causes the access terminal to, when the timer expires, (1) perform a timer based registration process with the network if a currently serving base station is not the same as a base station that serves the access terminal when the access terminal completes the last timer based registration process with the network, and (2) avoid performing another timer based registration process with the network if the currently serving base station is the same as a base station that serves the access terminal when the access terminal completes the last timer based registration process with the network. This network also includes a mechanism that causes the access terminal to reset the timer if the currently serving base station is the same as a base station that serves the access terminal when the access terminal completes the last timer based registration process with the network. In one implementation of this network, this network can include a mechanism that causes the access network to page access terminals based on locations of the access terminals obtained from the timer based registration process.

These and other aspects and implementations of the techniques and systems described in this patent application are described in greater detail in the drawings, the description and the claims.

DETAILED DESCRIPTION

Figure 1:
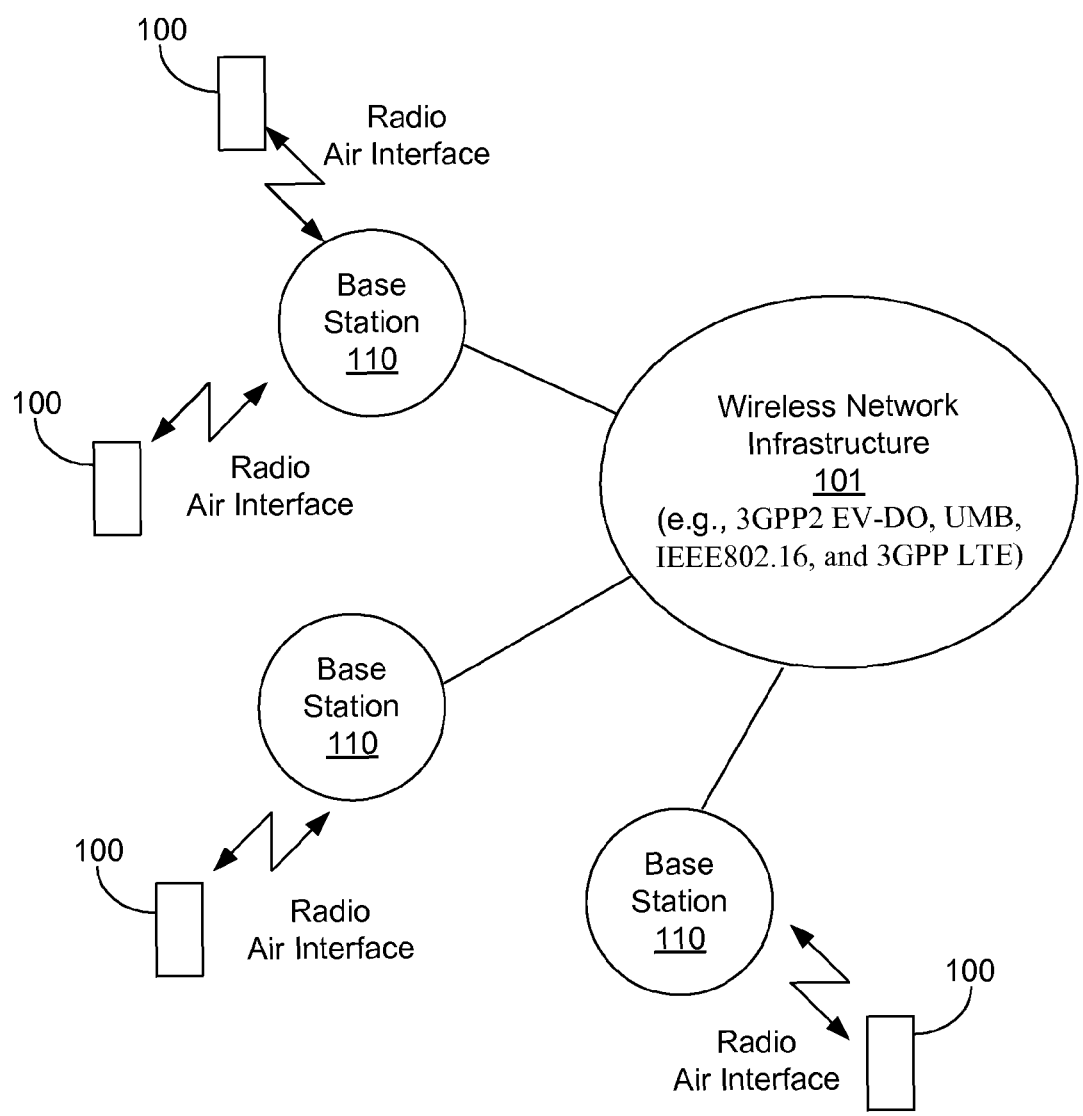
FIG. 1 shows an example of a wireless communication network that can be used to implement a timer based registration technique described in this patent application.

FIG. 1 shows an example of a wireless communication network that can be used to implement a timer based registration technique described in this patent application. The system includes a network of base stations (BSs) or base station transceivers 110 that are spatially distributed in a service area to form a radio access network (AN) to provide wireless access to wireless subscriber mobile stations referred to as access terminals 100. Each base station 110 defines a radio cell to provide radio coverage in its respective radio cell. In some implementations, a base station 110 may be designed to have directional antennas and to produce two or more directional beams to further divide each cell into different sectors. An access terminal 100 can be a stationary or mobile wireless communication device. Examples of a stationary wireless device include desktop computers and computer servers. Examples of a mobile wireless device include mobile wireless phones, Personal Digital Assistants (PDAs), and mobile computers.

In FIG. 1, a wireless network infrastructure system 101 are connected to the base stations 110 to control operations of the base stations 110 and to manage and control the wireless communications and services in the network. The wireless network infrastructure system 101 can be in communications with one or more other communication networks such as a public switched telephone network, a data packet network and a computer network such as the Internet. The wireless network infrastructure system 101 can be configured based on a selected wireless platform, e.g., 3GPP2 EV-DO (Evolution-Data Optimized), UMB (Ultra Mobile Broadband), IEEE802.16, and 3GPP LTE (Long Term Evolution).

In Mobile Terminated connection establishment procedures based on paging access terminals 100, the Access Network formed by the base stations 110 need to have information on the last known location of an Access Terminal 100 and, based on the last known location, the Access Network sends the "Paging" message(s) using Base Stations 110 located in a paging area that is at and around the last known location of the Access Terminal 100. When the Access Terminal 100 cannot be located in the initially configured Paging Area, the Access Network can repeat "Paging" by enlarging the Paging Area to increase the number of neighboring Base Stations 110 in the Paging area. Such "Paging" procedures can consume valuable air-interface and network resources. Hence it may be desirable to keep the Paging Area as small as possible.

In order to allow the Access Network to configure the Paging Area, the Access Terminal can be operated to register with the Access Network periodically and use the registration to inform the Access Network of its current location. The Radio Transmission Technologies support several types of 'Registration' procedures, viz. Power Up Registration, Power Down Registration, Zone Based Registration, Distance Based Registration, Timer Based Registration etc. While defining the procedures for access terminal registration, frequent registrations (too short registration timer etc.) may cause undue power consumption at the access terminal. Excessive registrations can cause unnecessary loading of the reverse link as well. On the other hand, a long registration timer can result in the loss of location accuracy of the access terminal as it moves within the network, thereby causing poor paging performance.

Timer Based Registration is defined as a registration method whereby an idle mobile station (or access terminal) performs registration with the access network at configured intervals. On expiration of the configured registration timer, the Access Terminal (AT) sends a Registration message to the Access Network. Such Registration notifies the Access Network of the presence and location of the Access Terminal, thereby allowing the Access Network to "page" the Access Terminal effectively.

The UMB specifications defined by the 3GPP2 support Zone Based Registration and Distance Based Registration for an Access Terminal that is in the Idle State. ShortRadius and LargeRadius variations of the Distance Based Registration method with the use of "SmallRegistrationDistanceEnabled" parameter provide granularity on the area over which an AT may be paged.

However, the scenario of a "stationary" AT which stays at some specific location for an extended period of time is not supported effectively in the existing UMB specifications. For example, an AT with the user staying at home, office, restaurant, airport, or such other locations for extended periods may end up getting paged over a LargeRadius, resulting in inefficient use of network resources.

This patent application discloses, among others, systems, apparatus and techniques that provide enhanced timer based registration to reduce unnecessary paging. The described techniques can be implemented to improve the network resource utilization and to reduce unnecessary operations at an AT to extend the battery operating time in the AT. In one implementation, the present Timer Based Registration can be combined with the Zone Based and Distance Based Registration methods to enhance the location/paging efficiency for stationary ATs. The number of Timer Based Registrations is kept to the minimum needed for supporting the "stationary AT" paging requirements.

In one implementation, the Access Terminal can maintain a RegistrationTimer that is reset to zero when the access terminal enters the Idle State. As the idle AT moves within the Access Network and performs Zone Based and/or Distance Based registrations or Timer Based registrations, the RegistrationTimer is again reset to zero, hence Timer Based registrations are not performed unnecessarily. If an AT stays at a certain location for extended periods, the AT sends Timer Based Registration message to the Access Network to provide its location information to the Access Network when a timer, the RegistrationTimer, exceeds a configurable RegistrationTimerLimit value. Such Timer Based registration, however, is not sent by the AT if the current serving Base Station is the Base Station with which a pervious registration was performed by the AT. Therefore, if an AT remains being served by the same base station, the timer based registration with the access network is fully performed only once during the period when the AT stays with the same base station and the AT can use the base station ID or other parameter capable of identifying the base station to determine whether a new timer based registration process is to be performed.

The timer of the timer based registration can be set based on one or more timer mechanisms. For example, an internal clock of an AT can be set with a timer as the timer for the timer based registration. This clock inside an AT continuously operates to count the time and, as the preset timer for the timer based registration expires, the AT can initiate a timer based registration with the access network. For another example, occurrence of an event can be used to serve as the timer to initiate a timer based registration, such as a paging period set for the access network to page ATs, ending an AT sleep state and other registration events such as the zone based registration and distance based registration. Implementations of the present timer based registration can keep the Access Network apprised of the location of the AT at all times, allowing the Access Network to page the AT effectively without unnecessary operations by the Access Network and a respective AT.

A method for providing the enhanced timer based registration used in a wireless network such as 3GPP2 EV-DO, UMB, IEEE802.16, and 3GPP LTE can allow access terminals to register with the network in order for the access network to track the position of access terminals and page access terminals more efficiently. The timer based registration method can be combined with other registration methods like zone based registration, distance based registration.

In one implementation under UMB, a registration timer in an access terminal can be used for the timer based registration. The registration timer can use the "PagePeriod" defined for the Paging Channel as the time tick and the "RegistrationTimerInterval" field defined as the RegistrationTimerInterval=PagePeriod×RegistrationTimer- Count. The access terminal computes and stores the value for the "RegistrationTimerInterval" field.

In another implementation under UMB, the "RegistrationTimerCount" field defined in the "RegistrationModeUpdate" message can be used as the timer for initiating the timer based registration. The access network uses the "RegistrationTimerCount" field in the "RegistrationModeUpdate" message to control the duration of timer based registration performed by an access terminal.

In yet another implementation under UMB, the registration timer can be reset when the access terminal enters the Idle State. The registration timer can also be reset after each successful timer based, zone based and distance based registration. When the access terminal changes the "TimerBasedRegistrationEnabled" status from NO to YES, the registration timer is started.

Figure 2:
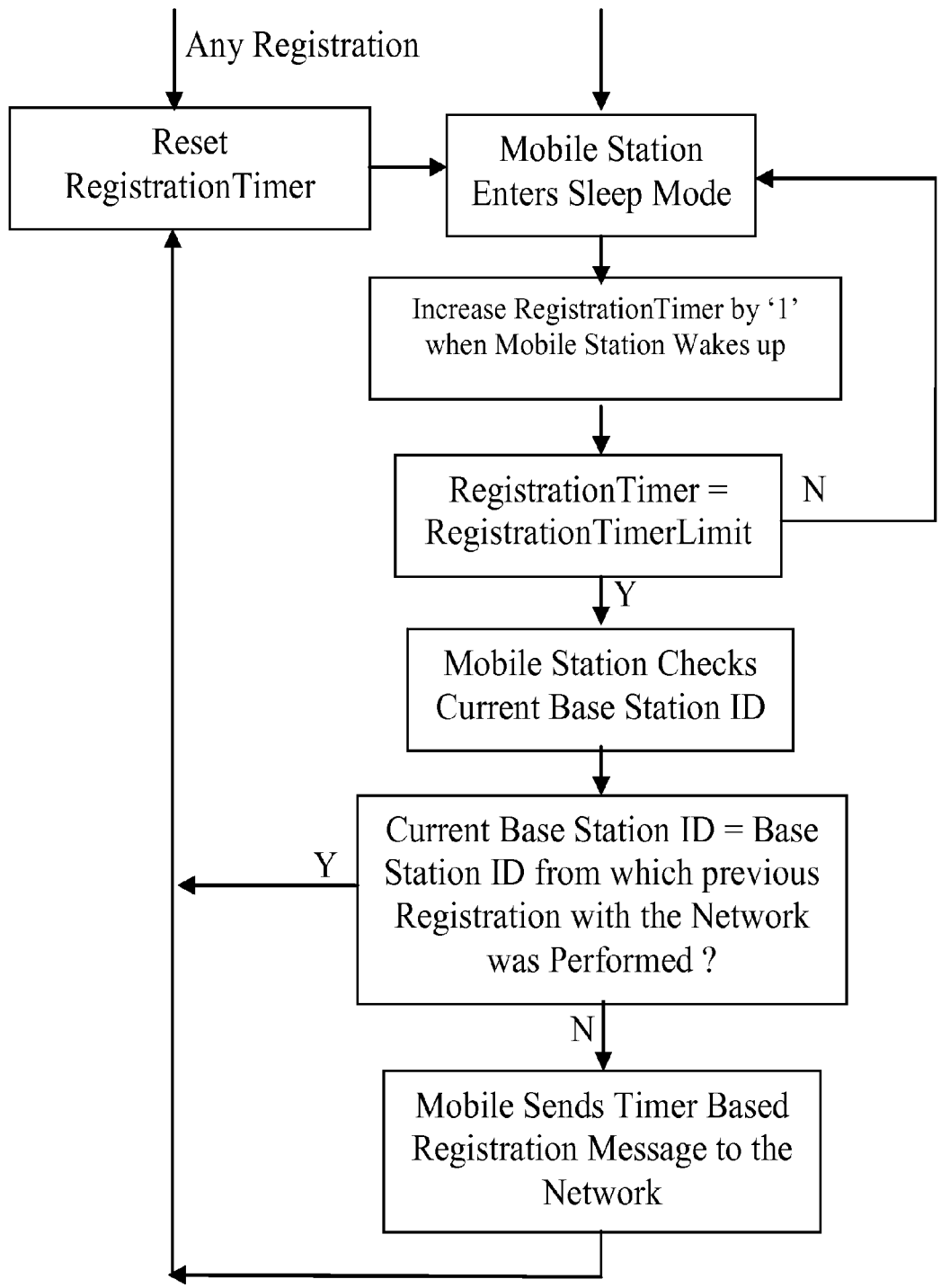
FIG. 2 shows an example of a timer based registration process for registering an access terminal to a network.

FIG. 2 shows a specific example of an implementation of the present timer based registration under UMB based on the idle state or sleep state of the access terminal. Each time an access terminal wakes up from the sleep mode for the paging message from the access network, the access terminal can increase the registration timer by one unit. If the registration timer reaches the "RegistrationTimerInterval" value, the access terminal checks whether it is still within the "SmallRegistrationDistance" zone in which the latest registration was sent. If not, the access terminal generates an "AirLinkManagement.SendRegistration" command to the session anchor InUse instance. Otherwise, the access terminal resets the registration timer to 0, and continues to monitor the current serving access network once the registration timer expires. In the example in FIG. 2, the access terminal compares the base station ID of the current serving base station and the base station ID of a previous timer based registration. If the two base station IDs are identical, the registration timer is reset and the registration with the access network is not performed. If the two base station IDs are different, the access terminal has changed in its location in the access network and thus the timer based registration is performed to update its current location to the access network.

In another implementation under UMB, the timber based registration can use the "TimerBasedRegistrationEnabled" bit in the "RegistrationModeUpate" message to control the timer based registration method used by the access terminal. When the access network sets the "TimerBasedRegistrationEnabled" bit to "1" in the "RegistrationModeUpdate" message, the access terminal enables the timer based registration upon receiving the message. If the access network sets the "TimerBasedRegistrationEnabled" bit to "0", the access terminal disables the timer based registration.

In addition, a Registration Record can be used to optimize the system performance. The Registration Record contains the Access Network IDs (ANID) (or SectorIDs) of Access networks in SmallRegistrationDistance zone in which the access terminal sends the registration message to. Both access terminal and access network maintain the Registration Record and keep the Registration Record updated. Furthermore, the above Registration Record can be used for the timer based registration. When the timer of the enhanced timer and distance based registration expires, the access terminal compares the current serving access network (or sector) with ANIDs (or SectorIDs) in Registration Record. If the access terminal detects ANID (or SectorID) of the serving access network (or sector) is still in the said Registration Record, the access terminal does not send registration message to the access network and reset the registration timer and continue monitoring the serving access network upon the registration timer expiration. If the access terminal detects the ANID (or SectorID) of the serving access network (or sector) not in the said Registration Record, the access terminal can start the registration process by sending the registration message to the network through the serving access network with the RegistrationReason set to Timer Based, updating its Registration Record with ANID of the current serving access network and the neighbor access networks, and resetting the registration timer and continuing monitoring the serving access network.

Upon receiving the registration message sent from the access terminal, the access network updates the said Registration Record associated to the access terminal.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or a variation of a subcombination.

Thus, particular implementations and embodiments are described. Various enhancements, variations and other implementations and embodiments can be made based on what is described in this patent application.

What is claimed is:

1. A method for efficiently registering access terminals in wireless communications, comprising:
   providing a timer for an access terminal to register with a network; and
   operating the access terminal to send a registration message when both (1) the timer expires and (2) a location of the access terminal has changed from a previous location when a last registration message was sent by the access terminal to the network;
   operating the access terminal to use an identity of a base station serving the access terminal to determine whether the location of the access terminal has changed from the previous location;
   operating the access terminal to not send the registration message when the base station serving the access terminal remains the same after the timer expires; and
   operating the access terminal to send, after the timer expires, the registration message when the base station serving the access terminal is a different base station from an initial base station serving the access terminal when the last registration message was sent by the access terminal to the network.

2. The method as in claim 1, wherein:
   the network is a 3GPP2 EV-DO (Evolution-Data Optimized) network.

3. The method as in claim 1, wherein:
   the network is a IEEE802.16 network.

4. The method as in claim 1, wherein:
   the network is a 3GPP LTE (Long Term Evolution) network.

5. The method as in claim 1, wherein:
   the network is a UMB (Ultra Mobile Broadband) network.

6. The method as in claim 5, wherein:
   the timer is associated with the PagePeriod defined for the Paging Channel in the UMB network.

7. The method as in claim 5, wherein:
the timer is associated with the RegistrationTimerCount field in the RegistrationModeUpdate message in the UMB network.

8. The method as in claim 1, wherein:
the timer is associated with an idle state of the access terminal.

9. A method for efficiently registering access terminals in a wireless communication network, comprising:
providing a timer for an access terminal to register with the network to cause the access terminal to initiate a timer based registration process with the network based on the timer, the timer based registration process with the network informing the network of a current location of the access terminal;
when the timer expires, causing the access terminal to perform a timer based registration process with the network if a currently serving base station is not the same as a base station that serves the access terminal when the access terminal completes the last timer based registration process with the network, and to avoid performing another timer based registration process with the network if the currently serving base station is the same as a base station that serves the access terminal when the access terminal completes the last timer based registration process with the network; and
causing the access terminal to reset the timer if the currently serving base station is the same as a base station that serves the access terminal when the access terminal completes the last timer based registration process with the network.

10. The method as in claim 9, wherein:
the network is a 3GPP2 EV-DO (Evolution-Data Optimized) network.

11. The method as in claim 9, wherein:
the network is a IEEE802.16 network.

12. The method as in claim 9, wherein:
the network is a 3GPP LTE (Long Term Evolution) network.

13. The method as in claim 9, wherein:
the network is a UMB (Ultra Mobile Broadband) network.

14. The method as in claim 13, wherein:
the timer is associated with the PagePeriod defined for the Paging Channel in the UMB network.

15. The method as in claim 13, wherein:
the timer is associated with the RegistrationTimerCount field in the RegistrationModeUpdate message in the UMB network.

16. The method as in claim 9, wherein:
the timer is associated with an idle state of the access terminal.

17. A wireless communication network, comprising:
an access network comprising a plurality of base stations to provide wireless radio access to access terminals in wireless radio communication with the access network;
a mechanism that provides a timer for an access terminal to register with the access network to cause the access terminal to initiate a timer based registration process with the network based on the timer, wherein the timer based registration process with the network causes the access terminal to send a registration message to inform the network of a current location of the access terminal;
a mechanism that causes the access terminal to, when the timer expires, (1) perform a timer based registration process with the network if a currently serving base station is not the same as a base station that serves the access terminal when the access terminal completes the last timer based registration process with the network, and (2) avoid performing another timer based registration process with the network if the currently serving base station is the same as a base station that serves the access terminal when the access terminal completes the last timer based registration process with the network; and
a mechanism that causes the access terminal to reset the timer if the currently serving base station is the same as a base station that serves the access terminal when the access terminal completes the last timer based registration process with the network.

18. The network as in claim 17, comprising:
a mechanism that causes the access network to page access terminals based on locations of the access terminals obtained from the timer based registration process.

* * * * *